July 9, 1963

A. J. SCHOLTES 3,096,607

COTTON PICKING SPINDLE

Filed Nov. 3, 1961

INVENTOR
Albert J. Scholtes

BY Mawhinney & Mawhinney
ATTORNEY

July 9, 1963  A. J. SCHOLTES  3,096,607
COTTON PICKING SPINDLE
Filed Nov. 3, 1961  2 Sheets-Sheet 2
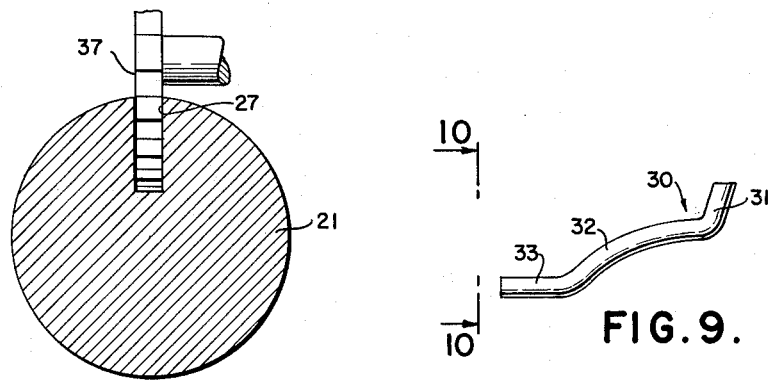
FIG. 8.
FIG. 9.
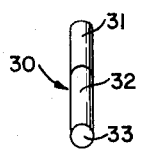
FIG. 10.
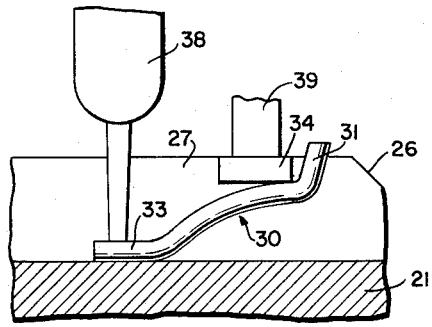
FIG. 11.
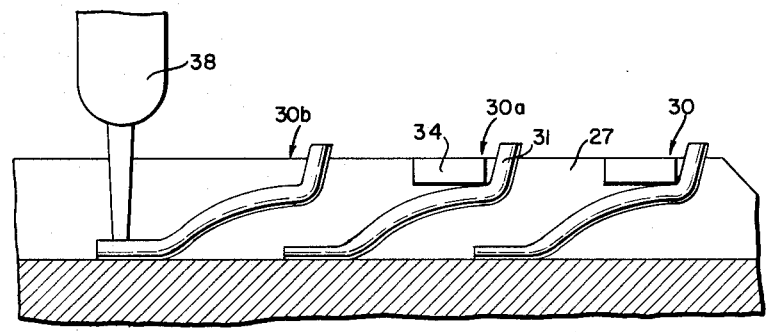
FIG. 12.
INVENTOR
Albert J. Scholtes
BY Mawhinney & Mawhinney
ATTORNEY United States Patent Office 3,096,607
Patented July 9, 1963

3,096,607
COTTON PICKING SPINDLE
Albert J. Scholtes, 714 Ohio Ave., Corpus Christi, Tex.
Filed Nov. 3, 1961, Ser. No. 149,987
4 Claims. (Cl. 56—50)

The present invention relates to picking spindle for cotton picker and method and has for its objects a picking spindle suitable for use in many presently made cotton picking machines and which spindle may be operated dry, without being moistened; the invention also relates to a method of making the spindle.

The present invention provides an improved picking spindle, and in its preferred embodiment is similar to the picking spindle disclosed and claimed in my prior Patent 3,017,734, granted January 23, 1962. In general the present invention has as objects the provision of a picking spindle having the advantages of the spindles of my previous patent, which advantages may include improved lint catching, avoidance of injury to the plants, as by spindle boring, the elimination of rubber and like materials subject to deterioration, etc.

A more particular object of the present invention is to provide a spindle which will function in an improved manner to engage and catch the lint due to the provision in the spindle of barbs which can be relatively closely spaced.

A related object of the present invention is the provision of a spindle in which the barbs are in an overlapping or overlying relationship, to thereby obtain closer barb spacing.

A further object of the present invention is to provide a spindle which will easily doff the cotton due to a longer barb spring portion, this longer spring portion giving rise to a more resilient barb which requires less pressure than in previous units in order to depress it for the doffing action.

Yet another object of the present invention is to provide a spindle and the barb unit construction in which the doffing action is enhanced when the barb end or barb exposed point is depressed, due to an increase in the inclination of the said barb end while it is being depressed.

A still further object of the present invention is to provide a spindle having advantages as set forth above, and which also is of superior strength because of the formation of the spindle from solid material.

A further object of the present invention is the provision of a barb system capable of use in either a tapered or untapered spindle.

Another object of the present invention is to provide an improved driving roll for the cotton picking spindle employing a friction driving roll. Heretofore, the driving rolls have been of such construction that they have lacerated the rubber friction track of the cotton picking machine, wearing this track. Typical driving rolls are knurled, having sharp points and hence they cut and tear the rubber friction track with their sharp point.

A still further object of the present invention is to provide an economical method for fabricating the spindle of the present invention.

Another object of the present invention is the provision of a barb system for spindles which may be either friction roll driven or gear driven.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 8 is a cross-sectional view illustrating a first step in a method for making a spindle in accordance with the present invention.

FIGURE 9 is an elevational view of a barb unit made in accordance with the present invention.

FIFGURE 10 is an end view of the barb unit of FIGURE 9, taken on the line 10—10 of FIGURE 9.

FIGURE 11 illustrates the assembly of a barb unit and a locking bar into a spindle body; and FIGURE 12 illustrates the continued or sequential placement of barb unit and locking bars in a spindle body in accordance with the method of the invention.

Referring more particularly to the drawings, and particularly to FIGURES 1 to 7a inclusive, 20 designates generally a spindle assembly and comprising the main spindle body 21 which is of a generally solid construction.

Figure 1:
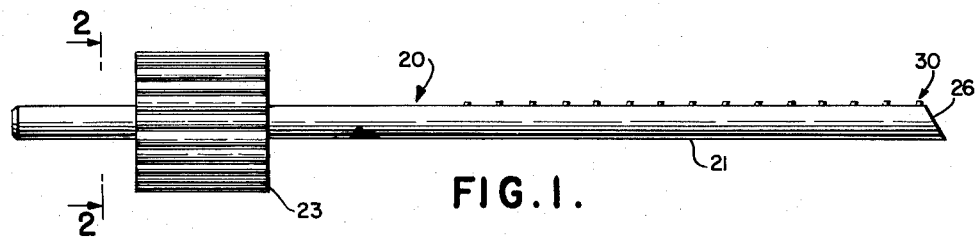
FIGURE 1 is a side elevational view of a spindle in accordance with the present invention.
Figure 2:
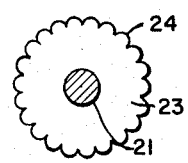
FIGURE 2 is a cross-sectional view taken on the line 2—2 of FIGURE 1 and showing the improved drive roll of the present invention.
Figure 3:
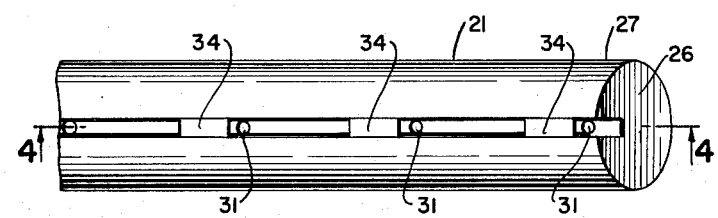
FIGURE 3 is a plan view, on an enlarged scale, of a part of the spindle shown in FIGURE 1.

In accordance with one feature of the invention, the spindle assembly 20 includes a drive roll 23 which is characterized by rounded protuberances 24, as is best seen in FIGURE 2. The protuberances 24 may be seen in FIGURES 1 and 2 to extend linearly of the roll 23. The rounded protuberances 24 of driving roll 23 give an epicycloid exterior surface to the drive roll 23.

The spindle body 21 has the free end 26 thereof beveled, and is provided with a generally radially extending slot 27. In the slot 27, as is best seen in FIGURES 4 through 7, there are a plurality of barb units generally designated 30, with successive barb units being designated 30a and 30b in FIGURE 4.

Figures 5, 6, 7:
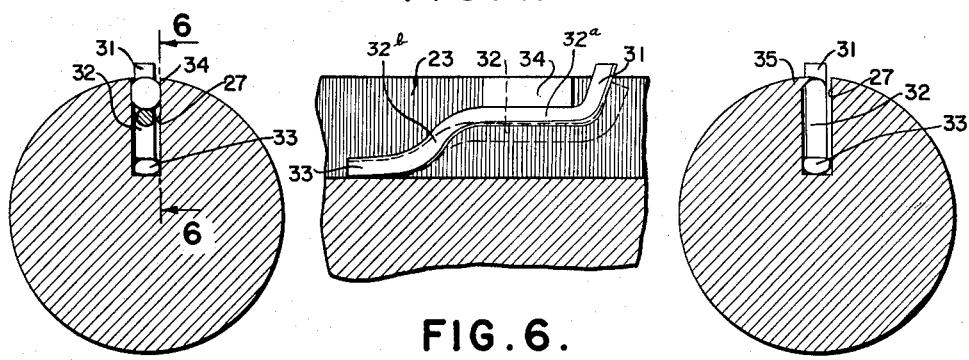
FIGURE 5 is a cross-sectional view taken on the line 5—5 of FIGURE 4.
FIGURE 6 is a view similar to FIGURE 4, but on an enlarged scale.
FIGURE 7 is a cross-sectional view similar to FIGURE 5 and showing a modified form of blocking means.

Each of the barb units 30, as is best seen in FIGURE 6, comprises an outer barb end 31 which extends generally transversely of the slot 27 and out of the slot 27 so as to extend beyond the surface of the body 21. As will be noted, the barb end 31 is slightly inclined towards the free beveled end 26 of body 21.

Supporting the barb end 31 is a spring portion 32 which may be seen to be somewhat curved. An anchor portion 33 extends generally parallel to the axis of body 21 and is positioned at the bottom of the slot 27.

As may be seen in FIGURE 5, the anchor portion 33 of barb unit 30 has been expanded laterally so as to engage the side walls of the slot 27, as well as the bottom of the slot 27.

A locking member or stop 34 is provided to limit the outward movement of the barb end 31, this member or stop in its preferred form being a round bar which overlies and is in juxtaposition to the spring portion 32 of the barb unit 30.

Figure 4:
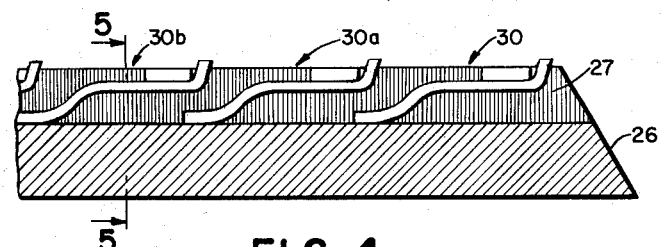
FIGURE 4 is a cross-sectional view taken on the line 4—4 of FIGURE 3.

As may be seen in FIGURE 4, the spring portion 32 of the several barb units 30, 30a, 30b are somewhat inclined, and the barb units themselves are in overlapping relationship. Therefore, there may be provided a relatively large number of barb units 30 in a given sized body 21, while at the same time the length of the spring portions 32 permits the barb ends 31 to be depressed readily and with a minimum of pressure. Further, depression of the barb end 31, as is indicated in the dotted line position shown in FIGURE 6, will cause the angle of inclination of barb end 31 to be increased to thereby afford doffing of the cotton with great ease. The overlapping of the barb units 30, 30a, 30b, etc., permits the spacing of the barbs to be varied.

When the barb units are in place, as shown particularly in FIGURES 4 and 6, the spring portion 32 assumes a position in which a forward section 32ᵃ of the spring portion is stressed beneath the stop member 34 so that this forward section 32ᵃ lies in contact with the substantially straight lower edge of the stop 34 and a rearward section 32ᵇ of the spring portion curves rearwardly and downwardly from the rear end of the forward section 32ᵃ to join the anchor portion 33 which also projects rearwardly from the lower rearward end of the rearward section 32ᵇ. The terms "forward" and "forwardly" and "rearward" and "rearwardly" are with reference to the tip end 26 of the spindle which is the forward end and the drive end containing the roller 23 which is characterized as the rear end.

The forward spring section 32ᵃ may be relatively short in the longitudinal direction of the slot so that the rear end of the section 32ᵃ, after projecting a short distance rearwardly beyond the rear end of the stop 34, turns downwardly in the rearward downwardly curved section 32ᵇ; or according to FIGURE 4 the forward section 32ᵃ may extend a substantial distance rearwardly of the rear edge of the stop member 34 before turning downwardly in the rearward spring section 32ᵇ. The descent of the rearward section 32ᵇ enables the barb units to be assembled closely in a longitudinal direction inasmuch as the anchor end 33 and a substantial lower portion of the rearward section 32b can be accommodated in the slot space beneath the spring section 32ᵃ of the next rearward barb unit.

For this reason the form of invention shown in FIGURE 6 may be desired inasmuch as with this form a greater number of the barb units may be contained in a given linear unit along the axis or length of the spindle. The arrangement permits close stacking of the barb units and substantial rear portions of the unit may underlap previous rearward units without in any way interfering with the functioning of the units to permit inward springing of the barbs transversely into the slot when doffing or when obstructions are encountered incident to the rotary motion of the spindle in use.

As shown in FIGURE 7, in place of the locking bars 34 the material of the spindle body 21 may be staked or offset, as appears at 35, from one or both sides of the slot walls at their outer portion to partially or fully overlie the spring portion 32 between the barb end 31 and the anchor portion 33, thus constituting the locking means for confining the barb unit 30 in place in the slot 27 and also for acting as a stop against which the spring portion 32 may abut due to the inherent elasticity of the barb unit 30.

Figure 7A:
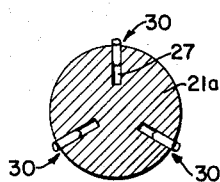
FIGURE 7a is an embodiment of a spindle in accordance with the present invention in which a plurality of rows of barb units are provided.

It is not necessary that there be just one slot and row of barb units 30 on a spindle, and as may be seen from FIGURE 7a, it is contemplated that a spindle body 21a may be provided with three slots 27 each containing barb unit 30 and secured in the slot 27 in the same manner and in the same configuration as is illustrated in FIGURES 1 to 7 inclusive.

While the spindle 20 has been shown as having no taper, it may, where desired, be tapered a slight amount.

A method for making the spindle assembly 20 is shown in FIGURES 8 through 12, there being shown in FIGURE 8 a solid spindle body 21 having a slot 27 cut therein as by a milling cutter 37. In FIGURE 9 there is shown in elevation a barb unit 30 which is made from a suitable material, such as a spring steel, and is thereby resilient. The barb unit has in its final form, as above set forth, an inclined barb end 31, the barb end 31 being generally upstanding, a spring portion 32 which is generally elongate and inclined, and an anchor portion 33. As will be apparent from FIGURE 10, it is suitable to use round stock for forming the barb unit 30.

A barb unit 30 is placed in the slot 27, the barb end 31 thereof being closest to the free beveled end 26 of the spindle body 21. The anchor portion 33 is placed at the bottom of the slot 27 and a vibrating tool 38, or other tool, is used to stake the anchor portion 33. This serves to expand or deform the anchor portion so that it is wedged between the walls of the slot 27 and/or cold welded to the bottom of the slot 27. The locking means is provided for the barb unit 30, this being accomplished as is shown in FIGURE 11 by pressing a locking bar 34 into the slot 27 so that it is thereby secured therein. The pressing of locking bar 34 may be accomplished by a suitable forcing tool 39. Preferably, the tools 38 and 39 are used simultaneously to secure the barb unit 30 to the body 21 and to secure the locking bar 34 to the body 21.

As may be seen in FIGURE 12, the second barb unit 30a is then placed in the slot 27 and secured as aforesaid, with the barb units in an overlying relationship as shown. Thereafter, successive barb units 30b, etc. are placed in position and secured, along with their locking element, until as many barb units as desired have been placed in position.

As will be apparent, the placement of the barb units begins at the free end 26, and proceeds towards the opposite end of the spindle body 21.

The above-described method for making the spindle assembly 20 is economical and provides for extremely rapid manufacture of these units.

As will be understood, other methods may be used to mechanically secure the barb unit in the slot, among which are welding, adhesives, etc.

Although I have disclosed herein the best forms of the invention known to me at this time, I reserve the right to all such modifications and changes as may come within the scope of the following claims.

What is claimed is:
1. A spindle for cotton pickers comprising
   (a) a substantially solid body having
   (b) a longitudinal slot open through the outer surface,
   (c) stop members at least partially crosswise of the slots at spaced longitudinal intervals,
   (d) closely spaced barb units in the slot comprising
   (e) anchor portions affixed to the spindle at inner portions of the slot,
   (f) spring portions having forward sections abutted beneath the stops and
   (g) rearward spring sections extending downwardly and rearwardly from the rear ends of the forward spring sections to the forward ends of the anchor portions, said anchor portions and at least parts of said rearward spring sections underlapping forward spring sections of next rearward barb units, and
   (h) barbs outstanding from the front ends of the forward spring sections forwardly of the stop members.
2. A spindle for cotton pickers as claimed in claim 1, in which
   (i) said anchor portions are located in offset relation rearwardly of the stop members.

3. A spindle for cotton pickers as claimed in claim 1, in which
   (i) the anchor portions are offset rearwardly from the spring portions.
4. A spindle for cotton pickers as claimed in claim 1, in which
   (i) the barbs, spring portions and anchor portions are as to each unit made integrally from a single length of elastic rod,
   (j) the elastic rods from the tip ends of the barbs to the most rearward end of the anchor portions extending continuously rearwardly free of forwardly return portions.

References Cited in the file of this patent

UNITED STATES PATENTS

| | | |
|---|---|---|
| 2,667,726 | Vogel | Feb. 2, 1954 |
| 2,699,638 | Rust | Jan. 18, 1955 |
| 2,700,864 | Fogle | Feb. 1, 1955 |
| 2,832,186 | La Rue | Apr. 29, 1958 |
| 2,848,860 | Fergason | Aug. 26, 1958 |
| 3,017,734 | Scholtes | Jan. 23, 1962 |